United States Patent [19]

Jordan et al.

[11] Patent Number: 4,845,939
[45] Date of Patent: Jul. 11, 1989

[54] GAS TURBINE ENGINE WITH BYPASS DIVERTER MEANS

[75] Inventors: Terence Jordan, Gloucestershire; John M. Hall, Bristol, both of England

[73] Assignee: Rolls-Royce plc, London, United Kingdom

[21] Appl. No.: 79,030

[22] Filed: Jul. 29, 1987

[30] Foreign Application Priority Data

Aug. 12, 1986 [GB] United Kingdom ............... 8619653

[51] Int. Cl.⁴ ............................................. F02K 3/04
[52] U.S. Cl. .............................. 60/226.1; 60/226.3; 244/6; 244/207
[58] Field of Search .................. 60/226.3, 226.1, 262, 60/226.2; 244/207, 6 R

[56] References Cited

U.S. PATENT DOCUMENTS

| 3,332,644 | 7/1967 | Whittley. | |
|---|---|---|---|
| 3,938,328 | 2/1976 | Klees | 60/226.3 |
| 4,054,030 | 10/1977 | Pedersen | 60/226.2 |
| 4,326,686 | 4/1982 | Runge | 60/226.1 |

FOREIGN PATENT DOCUMENTS

| 2153929 | 5/1973 | Fed. Rep. of Germany | 244/207 |
|---|---|---|---|
| 1483852 | 6/1967 | France | 244/207 |
| 1594659 | 8/1981 | United Kingdom. | |
| 2130984 | 6/1984 | United Kingdom. | |
| 2143483 | 2/1985 | United Kingdom | 244/207 |

Primary Examiner—Donald E. Stout
Attorney, Agent, or Firm—Oliff & Berridge

[57] ABSTRACT

A gas turbine engine for a compound helicopter comprises a core gas generator, an upstream fan, and a power turbine. Bypass air is selectively directable to either augmentor wings, or to a second power turbine which is mechanically coupled to the first power turbine.

7 Claims, 2 Drawing Sheets

GAS TURBINE ENGINE WITH BYPASS DIVERTER MEANS

This invention relates to a gas turbine engine of the bypass type with variable bypass means.

BACKGROUND OF THE INVENTION

British patent application No. 8234318 discloses a so-called compound helicopter in which two bypass type gas turbine engines are installed in a helicopter provided with augmentor wings. Bypass air is directed from the engine via ducting to each augmentor wing which is adapted to augment the thrust and lift of the helicopter rotor blades. Such augmentor wings are more particularly described in U.S. Pat. No. 3,332,644 to Donald C Whittley.

The gas turbine engines of the compound helicopter mentioned above are of the free power turbine configuration. A low pressure power turbine is coupled to the helicopter rotors while a high pressure turbine drives the engine compressor. A variable area final nozzle is provided to vary the pressure drop across the power turbine and in order to control the power output to the rotor blades. When maximum power is required for hovering or vertical take-off, the final nozzle is set to maximum area to provide a high pressure drop across the power turbine. For maximum forward speed the final nozzle area is set to a minimum to increase the momentum of the exhaust gases to give maximum forward thrust.

SUMMARY OF THE INVENTION

When the compound helicopter is hovering or in a vertical take-off or landing mode, lift is provided by the helicopter rotor blades and by bypass air which is ejected through nozzles in the augmentor wing. However, it is thought that for the same size engine more lift could be produced in this mode if the energy of the bypass air was used to drive the helicopter rotor blades. In this case all of the output power from the engine would be directed to driving the rotor blades.

The invention as claimed provides a bypass gas turbine engine having bypass diverter means which in a first mode direct bypass air through ducting to one or more augmentor wings and in a second mode direct bypass air to a second power turbine.

BRIEF DESCRIPTION OF THE DRAWINGS

The invention will now be described by way of example with reference to the accompanying drawings.

DESCRIPTION OF THE PREFERRED EMBODIMENTS

Figure 1:
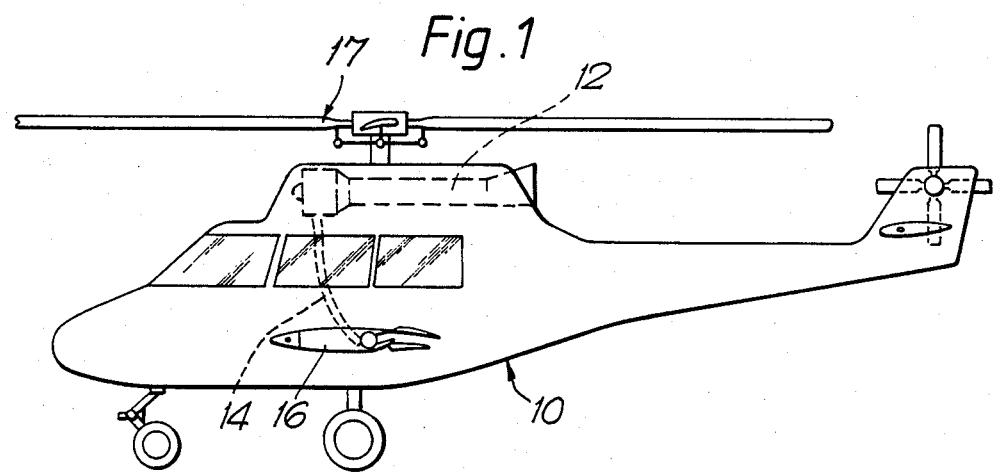
FIGS. 1 and 2 show side and plan views of a compound helicopter.
Figure 2:
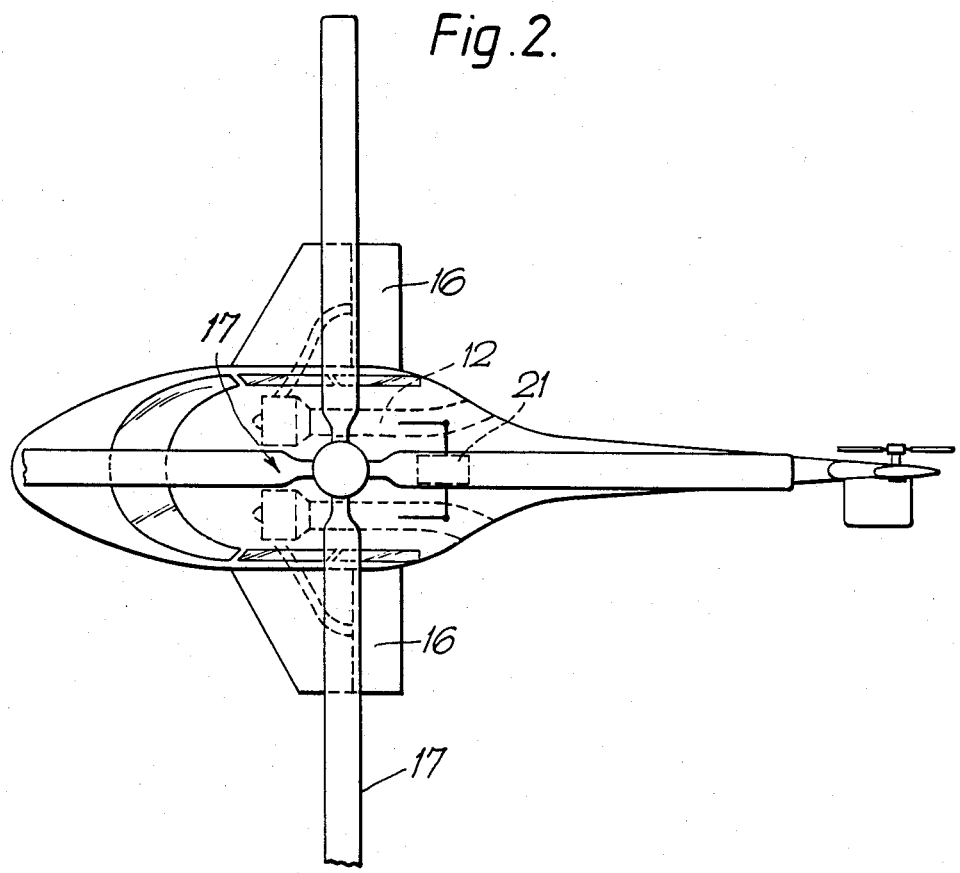

Referring to FIGS. 1 and 2 a helicopter 10 has two gas turbine engines 12 of the bypass type. Ducting 14 is provided to carry bypass air to two augmentor wings 16 of the Whittley type which can augment the lift and thrust provided by a main rotor 17 which is driven by power turbines of each engine 12 via a main gearbox 21.

Figure 3:
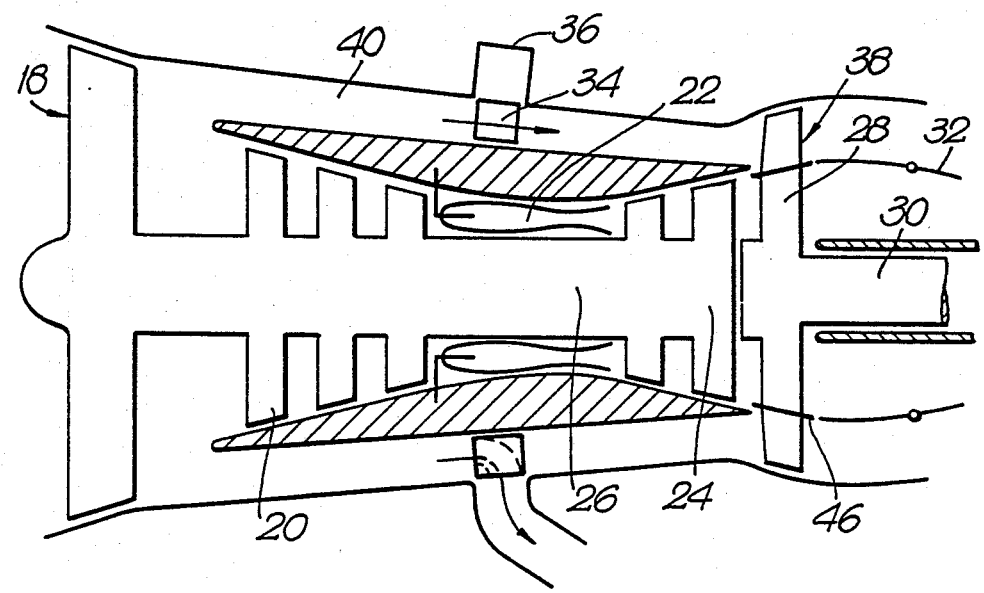
FIG. 3 shows diagramatically a gas turbine engine according to the present invention.

Referring now to FIG. 3 each engine 12 has a fan 18 mounted upstream of the rest of the engine 12 which serves to raise the pressure of the incoming air flow. Downstream of the fan 18 the flow is split into a bypass flow and a core flow. The core flow is further compressed by a multi-stage core compressor 20 and is then heated in an annular combustion chamber 22. The core flow passes from the combustion chamber 22 to drive a high pressure turbine 24. The core compressor 20, the combustion chamber 22 and the high pressure turbine 24 are collectively known as the core gas generator. The fan 18, core compressor 20 and the high pressure turbine 24 are all mounted on a common shaft 26 so that the fan 18 and compressor 20 may be driven by the high pressure turbine 24.

A first power turbine 28 is located downstream of the high pressure turbine 24 and is also driven by the core flow expanding therethrough. The first power turbine 28 is mounted on an output shaft 30 which is linked to the helicopter main gearbox 21. Finally, the core gases pass through a variable area final nozzle 32 to atmosphere.

The bypass air flows from the fan 18 into an annular bypass duct 40 in which a changeover valve 34 is situated. Such valves are well known in the art and need not be described in detail here. Suffice to say that in a first position the changeover valve diverts the bypass air into an annular scroll chamber 36, and, in a second position attained by turning the valve 34, allows the bypass air to continue along the bypass duct 40. Ducting 14 links the scroll chamber 36 with the augmentor wings 16.

A second power turbine 38 is located at the end of the bypass duct 40 to receive bypass air when the changeover valve is in the second position. The second power turbine 38 is mounted on the first power turbine 28 radially outward therefrom. A shroud 46 is positioned between the two turbines in order to prevent mixing of the core gas and bypass air.

When the engine is in the first mode, that is with the changeover valve 34 diverting bypass air to the augmentor wings 16, the helicopter rotor blades 18 are driven solely by the first power turbine 28. The augmentor wings 16 utilize the bypass air to provide a relatively high degree of lift at low forward speeds and also contribute to the total forward thrust. The variable area nozzle 32 is used to vary the pressure ratio across the first power turbine 28 at any given engine speed. A relatively high pressure drop generates more power for driving the rotor blades 18 which at a low aircraft speed compensates for the reduced lift generated by the wings. At higher aircraft speeds the nozzle area is reduced so that the pressure drop across the nozzle gives greater jet thrust by increasing the exit velocity of the core gases while a lower pressure drop across the power turbine is acceptable as the wings generate more lift.

In the second mode, the changeover valve 34 allows bypass air to continue along the bypass duct 40 to the second power turbine 38. In this mdoe the augmentor wings 16 receive no bypass air. At very low forward speeds or when the aircraft is hovering or taking off, all of the power output from the engine will be directed to the rotor blades. In this mode the variable area nozzle would be at a maximum area position so that little jet thrust is generated.

Figure 4:
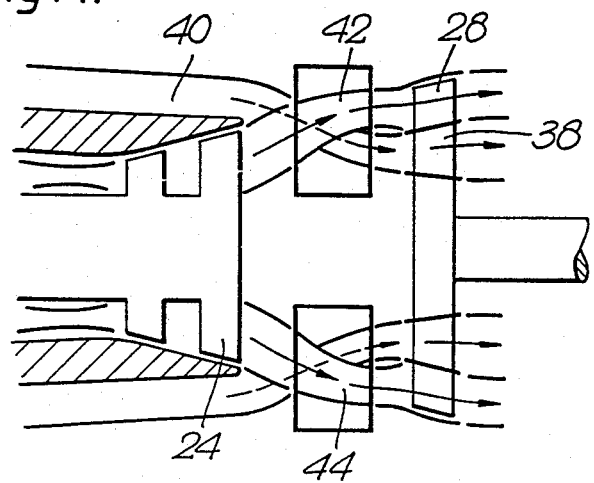
FIG. 4 shows a second embodiment of the engine of the present invention.

FIG. 4 shows an alternative embodiment of the same invention wherein the second power turbine 38 is situated radially inward of the first turbine 28. In this configuration the speed of the turbine blades can better suit the relative temperature and pressure of their respective flows. A plurality of intermeshing passageways 42, 44 are provided just upstream of the power turbines 28, 38 to direct both gas flows onto their respective turbines.

When the engine is in the second mode there is no net work output from compressing and then expanding the bypass air. However, when maximum output from the power turbine is required to drive the rotor blades it would not be possible to simply close the bypass duct as this causes the airflow through the fan to break down due to the reduction in downstream flow area.

We claim:

1. A bypass gas turbine engine comprising an upstream fan; a core gas generator, comprising compressor means, combustion equipment and turbine means all in flow series, adapted to receive a core gas flow from the fan; a bypass duct adapted to receive a bypass flow from the fan; a first power turbine which is driven by the core gas after passing through the core gas generator; and bypass diverter means located within the bypass duct and adapted in a first mode to divert unheated bypass air to one or more augmentor wings and in a second mode to allow unheated bypass air to be directed to drive a second power turbine which is mechanically coupled to the first power turbine.

2. A bypass gas turbine engine as claimed in claim 1 wherein the variable bypass means comprises a change-over valve.

3. A bypass gas turbine engine as claimed in claim 1 wherein the second power turbine is situated radially outward of the first power turbine and is mounted thereon.

4. A bypass gas turbine as claimed in claim 1 wherein the first power turbine is situated radially outward of the second power turbine and is mounted thereon and the engine further comprises intermeshing passageways provided to direct a radially inner core flow to the first power turbine and to direct a radially outer bypass flow to the second power turbine.

5. A bypass gas turbine engine as claimed in claim 1 further comprising a variable area final exhaust nozzle situated downstream of the first power turbine through which the core flow is passed.

6. A compound helicopter comprising:
   at least one augmentor wing; and
   at least one bypass gas turbine engine comprising an upstream fan; a core gas generator, comprising compressor means, combustion equipment and turbine means all in flow series, adapted to receive a core gas flow from the fan; a bypass duct adapted to receive a bypass flow from the fan; a first power turbine which is driven by the core gas after passing through the core gas generator; and bypass diverter means located within the bypass duct and adapted in a first mode to divert unheated bypass air to said at least one augmentor wing and in a second mode to allow unheated bypass air to be directed to drive a second power turbine which is mechanically coupled to the first power turbine.

7. A bypass gas turbine engine comprising an upstream fan; a core gas generator, comprising compressor means, combustion equipment and turbine means all in flow series, adapted to receive a core gas flow from the fan; a bypass duct adapted to receive a bypass flow from the fan; a first power turbine which is driven by the core gas after passing through the core gas generator; and bypass diverter means located within the bypass duct and adapted in a first mode to divert bypass air to one or more augmentor wings and in a second mode to allow bypass air to be directed to drive a second power turbine which is mechanically coupled to the first power turbine; wherein the first power turbine is situated radially outward of the second power turbine and is mounted thereon and the engine further comprises intermeshing passageways provided to direct a radially inner core flow to the first power turbine and to direct a radially outer bypass flow to the second power turbine.

* * * * *